J. W. JOHNSON.
CAR BRAKE.
APPLICATION FILED NOV. 18, 1908.
939,701.
Patented Nov. 9, 1909.
2 SHEETS—SHEET 1.
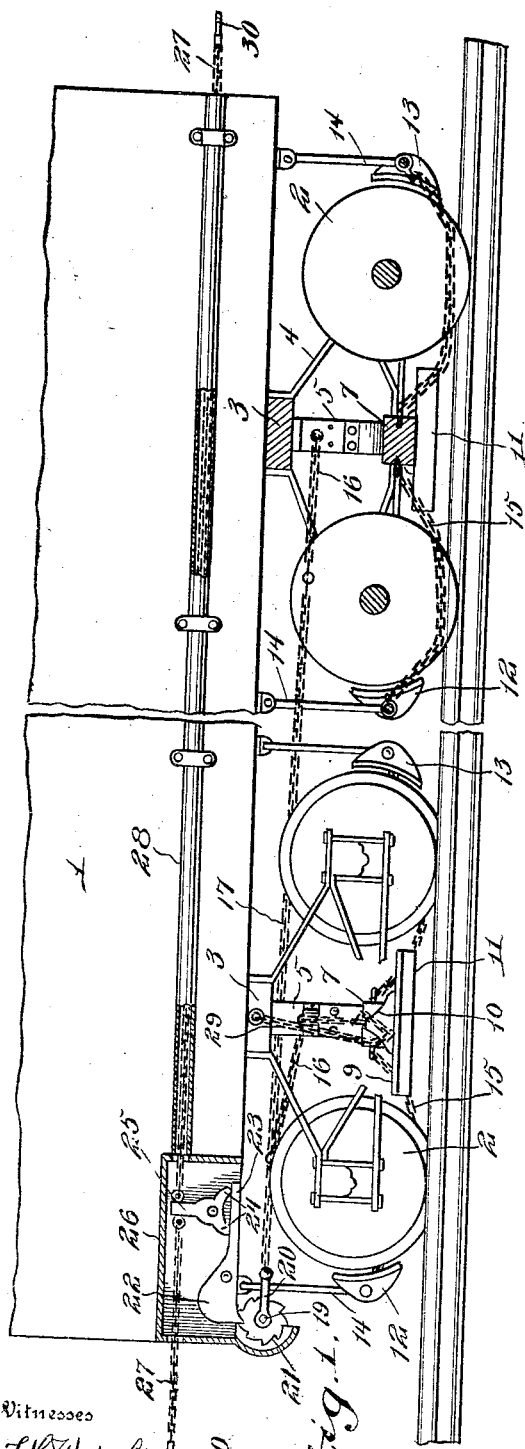
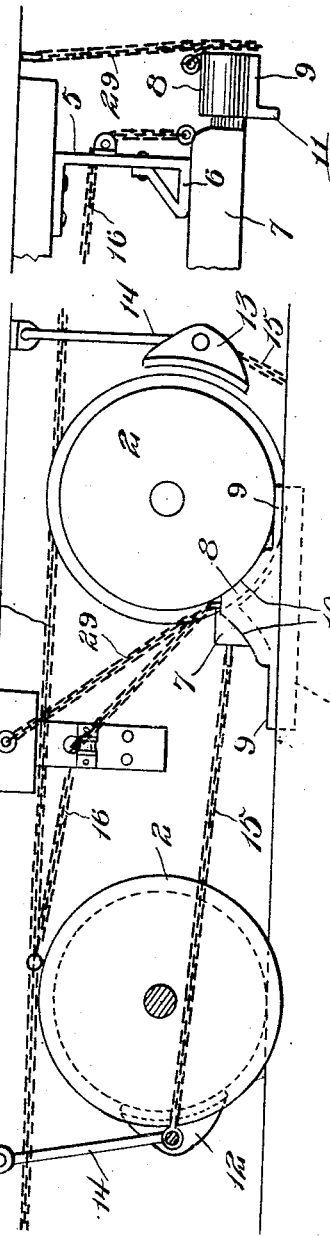
Witnesses
Inventor
John W. Johnson,
By Victor J. Evans,
Attorney.

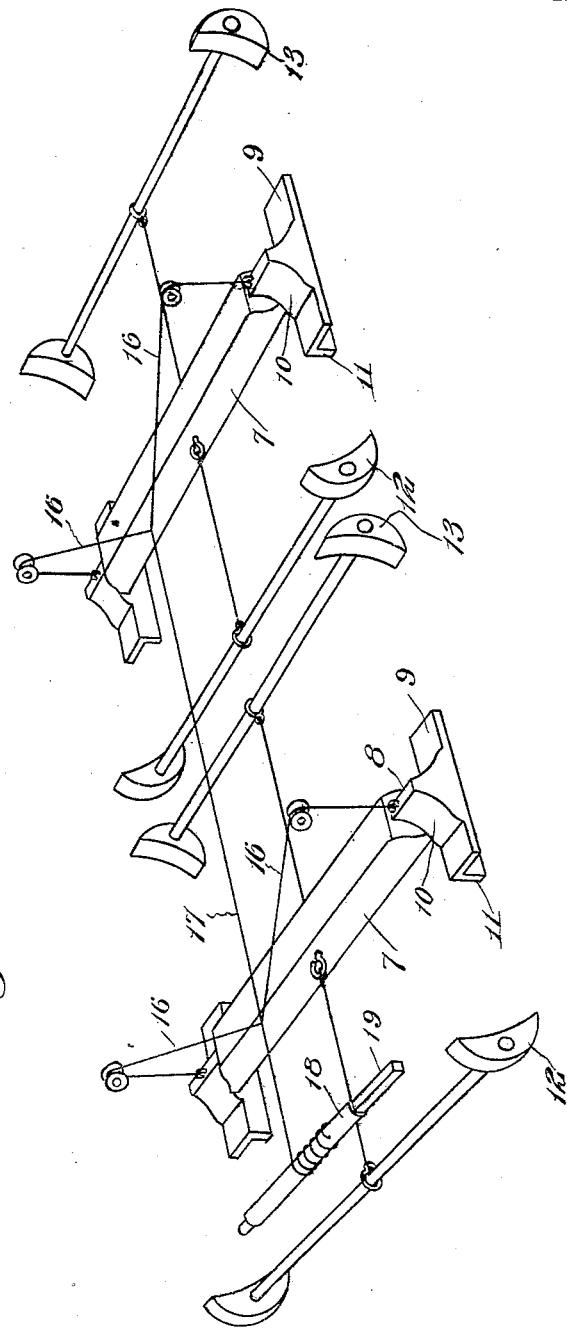

UNITED STATES PATENT OFFICE.

JOHN W. JOHNSON, OF CUSTER, OKLAHOMA.

CAR-BRAKE.

939,701.  Specification of Letters Patent.  Patented Nov. 9, 1909.

Application filed November 18, 1908. Serial No. 463,275.

*To all whom it may concern:*

Be it known that I, JOHN W. JOHNSON, a citizen of the United States, residing at Custer, in the county of Custer and State of Oklahoma, have invented new and useful Improvements in Car-Brakes, of which the following is a specification.

This invention relates to car brakes, the object in view being to provide an emergency brake for railways and street cars, the brake shoes and the emergency brake connections being so constructed and arranged as not to interfere with the usual connections by means of which the engineer or brakeman effects the application of the brakes under ordinary conditions.

The invention also has for its object to provide means for normally holding the brake shoes at an elevation above the track rails; also means for releasing the brake shoe suspending connections and allowing the brake shoes to move downward into contact with the rails and wheels; also means whereby one shoe, when moved against the track rail and wheel is adapted to set one or more additional brake shoes.

The primary object of the invention is to provide an effective and reliable brake, combined with operating connections therefor which are automatically tripped in case one or more cars become uncoupled from the remainder of the train or in case the engine becomes ditched or for any reason breaks the coupling between itself and the cars. In case of such an emergency, the brakes of all the cars are set thus avoiding serious loss of life and property.

With these and other objects in view, the nature of which will more fully appear as the description proceeds, the invention consists in the novel construction, combination and arrangement of parts as herein fully described, illustrated and claimed.

In the accompanying drawings:—Figure 1 is a view partly in side elevation and partly in longitudinal section of a car showing the improved brake mechanism applied thereto. Fig. 2 is an enlarged view partly in section and partly in elevation showing an adjacent pair of truck wheels and the connections by which one brake shoe is adapted to set another. Fig. 3 is a detail elevation taken at right angles to Fig. 2, showing one of the combined wheel and track brake shoes and its relation to the truck frame. Fig. 4 is a diagrammatic perspective view illustrating the brake shoe suspending, releasing and operating connections.

Referring to the drawings, 1 designates a car body, 2 the truck wheels, 3 the truck bolsters and 4 the truck frame, said parts being of the usual construction and arrangement.

Extending downward from the bolsters 3 and secured rigidly thereto at or near the opposite ends thereof, are depending brackets 5, the lower ends of which constitute stops 6 for limiting the upward movement of a brake beam 7, which, when not in use, rests under and against the oppositely arranged stop portions 6 of the bracket 5 in the manner illustrated in Figs. 1 and 3.

Each brake beam 7 carries at its opposite ends combined wheel and track brake shoes 8, the same being best illustrated in Fig. 4 wherein it is seen to comprise a rail-engaging portion 9, a wheel-engaging portion 10 and a flange 11 which bears against the inner side of the track rail, whereby the oppositely located shoes are held in proper alinement with the rails and wheels when in their lowered positions, as shown in Fig. 2. The wheel-engaging portion 10 is provided with a pair of reversely inclined and concaved wheel-engaging faces adapting the same to engage the wheel in rear thereof, no matter in which direction the car is moving.

In addition to the combined wheel and track brake shoes, I employ other ordinary brake shoes 12 and 13 which are supported by means of pivotal links 14 beneath the car body. From each of the brake shoes 12 and 13, a connector chain 15 extends to the combination brake shoe 8 so that when the brake shoe 8 is in engagement with one of the wheels and the rail, as shown in Fig. 2, the forwardly extending connector chain 15 attached to said brake shoe is drawn rearward thereby setting the brake shoe 12 of the next wheel in advance. In this way all of the brake shoes are simultaneously set with the exception of the shoes 13 which lie behind the wheels. When the car is moving in the opposite direction, the action of the combination brake shoes is exactly the same but the other brake shoes 13 are set against their respective wheels while the brake shoes 12 are slacked away from the wheels. Thus no matter in which direction the car is moving a brake shoe is applied to each and every wheel.

The combined wheel and track brake shoes 8 are normally held inactive by means of suspending chains or connections 16 attached at one end to the shoes 8 and connected at their outer or inner ends to a winding connection 17 shown in the form of a chain, one end of which is attached to and wrapped around a winding shaft 18 at or near one end of the car. This winding shaft 18 is journaled in suitable bearings and has one end squared as shown at 19 to receive a detachable winding crank 20. At one end the shaft 18 is provided with a ratchet wheel 21 which is engaged by a weighted dog 22 having a lever arm 23 which bears against the two shorter arms 24 of a three-armed trip lever 25 which is shown as pivotally mounted in a housing 26 at or near one end of the car. Connected to the upwardly extending longer arm of said trip lever is a tripping connection 27 of greater length than the car body, said tripping connection being shown as arranged to slide through a guide tube 28 which may be secured to the outside of the car body at either side thereof. It will be understood that when the tripping connection 27 is pulled in either direction, the lever arm 23 of the dog 22 will be depressed, thereby releasing the ratchet wheel 21 and the shaft 18 and allowing the brake shoes 8 to move downward into contact with the rails, whereupon they find their way beneath the following wheels in the manner illustrated in Fig. 2. 29 designates stay chains connected to the brake shoes 8 and truck frame to prevent the shoes from getting too far beneath the wheels in connection with which they coöperate.

It will be understood that each of the cars may be tripped in the manner above described and in coupling the cars together the tripping connections 27 are also coupled together by providing the extremities thereof with hooks and eyes 30 or their equivalent. Therefore when a break occurs between any two cars in the train or between the train and the engine, the tripping connections 27 on all the cars are operated to work the trips and release the brakes in the manner described.

It will of course be apparent that the arrangement of brake shoes and operating connections therefor illustrated in connection with a steam railway car may, if desired, be employed in connection with an eight-wheel street railway car. It will also be understood that various changes may be made in the form, proportion and minor details of construction without departing from the principle or sacrificing any of the advantages of the invention.

If desired, hand levers may be connected with the trip connection 27 at one or both ends of each car and also in the engine cab so that said trip connection may be operated by the engine or by the brakeman or conductor at either end of the train, thus setting the brakes.

I claim:—

1. A car brake embodying a combined wheel and rail brake shoe adapted to simultaneously engage a wheel and the adjacent rail, means for normally suspending said brake shoe above and out of contact with the rail and also out of contact with the wheel, and means for automatically releasing said brake shoe upon the separation of the cars from each other, substantially as described.

2. A car brake embodying a combined wheel and rail brake shoe adapted to simultaneously engage a wheel and the adjacent rail, a winding shaft having a flexible connection extending therefrom to said brake shoe for releasing the latter, and means operated by the parting of the cars for tripping said winding shaft.

3. A car brake embodying a combined wheel and rail brake shoe, means for suspending said brake shoe out of contact with the rail and wheel, a winding shaft, a flexible connection extending from said shoe to said shaft, a dog for locking said shaft, and means operable upon the separation of the cars for tripping said dog.

4. A car brake embodying a combined wheel and rail brake shoe adapted to simultaneously engage a wheel and the adjacent rail, means for flexibly supporting said brake shoe out of contact with the rail and wheel comprising a chain, and a winding shaft for said chain, dog and ratchet elements for locking said shaft, a trip lever adapted to coöperate with said dog, and a flexible connection extending lengthwise of the car and adapted when drawn in either direction to operate said trip lever, substantially as and for the purpose described.

5. A car brake embodying a combined wheel and rail brake shoe, means for suspending said shoe out of contact with the rail and wheel comprising chains, a winding shaft for said chains, means for automatically tripping said shaft upon the separation of the cars, another wheel brake shoe, and a connector chain extending from one of said shoes to the other, whereby one shoe is adapted when set, to set the other shoe.

6. A car brake embodying a brake beam, combined wheel and rail brake shoes carried by opposite ends of said brake beam, suspending chains for suspending said brake shoes out of contact with the rails and wheels, a winding shaft for said chains, brackets for limiting the upward movement of said brake beams, means for releasing said suspending chains, and stay chains for limiting the back and forth movements of said brake shoes.

In testimony whereof I affix my signature in presence of two witnesses.

JOHN W. JOHNSON.

Witnesses:
   JOHN L. FLETCHER,
   R. M. SMITH.